(12) United States Patent
Agostinelli et al.

(10) Patent No.: US 6,829,089 B2
(45) Date of Patent: Dec. 7, 2004

(54) MONOCENTRIC AUTOSTEREOSCOPIC OPTICAL APPARATUS USING A SCANNED LINEAR ELECTROMECHANICAL MODULATOR

(75) Inventors: John A. Agostinelli, Rochester, NY (US); Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/810,476

(22) Filed: Mar. 26, 2004

(65) Prior Publication Data

US 2004/0179264 A1 Sep. 16, 2004

Related U.S. Application Data

(62) Division of application No. 10/137,676, filed on May 2, 2002, now Pat. No. 6,768,585.

(51) Int. Cl.[7] .............................................. G02B 27/22
(52) U.S. Cl. .......................... 359/466; 359/464; 353/7; 353/10; 353/30
(58) Field of Search .............................. 359/462–477; 353/7, 10, 30

(56) References Cited

U.S. PATENT DOCUMENTS

| | | |
|---|---|---|
| 3,748,015 A | 7/1973 | Offner |
| 4,124,978 A | 11/1978 | Wagner |
| 4,331,390 A | 5/1982 | Shafer |
| 4,623,223 A | 11/1986 | Kempf |
| 4,799,763 A | 1/1989 | Davis et al. |
| 4,854,688 A | 8/1989 | Hayford et al. |
| 5,206,499 A | 4/1993 | Mantravadi et al. |
| 5,255,028 A | 10/1993 | Biles |
| 5,311,360 A | 5/1994 | Bloom et al. |
| 5,319,968 A | 6/1994 | Billing-Ross et al. |

(List continued on next page.)

OTHER PUBLICATIONS

G. J. Kintz; Autostereoscopic Properties of Spherical Panoramic Virtual Displays; SID 99 Digest, pp. 1000–1003.
S.A. Benton, T.E. Slowe, A.B. Kropp, and S.L. Smith; Micropolarizer–Based Multiple–Viewer Autostereoscopic Display; Stereoscopic Displays and Virtual Reality Systems VI, SPIE, Jan. 1999, pp. 1–8.
S. McKay, G. Mair, S. Mason, K. Revie; Membrane Mirror Based Autostereoscopic Display for Tele–Oeration and Telepresence Applications; Stereoscopic Displays and Virtual Reality Systems VII, Proceedings of SPIE vol. 3957, pp. 198–207.
W. Smith; Modern Optical Engineering, The Design of Optical Systems, McGraw–Hill Inc., pp. 42–45.

*Primary Examiner*—Drew A. Dunn
*Assistant Examiner*—Joshua L Pritchett
(74) *Attorney, Agent, or Firm*—Nelson Adrian Blish

(57) ABSTRACT

A monocentric arrangement of optical components providing stereoscopic display of a virtual image, electronically generated, line by line, from an electromechanical grating light modulator (85) and projected, as a real intermediate image, near the focal surface (22) of a curved mirror (24) by means of a scanning ball lens assembly (100). To form each left and right intermediate image component, a separate image generation system (70) comprises a scanning ball lens assembly (100) comprising a spherical lens (46) for wide field of view and a reflective surface (102). A monocentric arrangement of optical components images the left and right scanning ball lens pupil at the corresponding left and right viewing pupil (14) of the observer (12) and essentially provides a single center of curvature for projection components. Use of such a monocentric arrangement with electromechanical grating light modulator (85) as a linear image source and scanning ball lens assemblies (100) provides an exceptionally wide field of view with large viewing pupil (14).

5 Claims, 12 Drawing Sheets

U.S. PATENT DOCUMENTS

| | | |
|---|---|---|
| 5,572,229 A | 11/1996 | Fisher |
| 5,671,992 A | 9/1997 | Richards |
| 5,908,300 A | 6/1999 | Walker et al. |
| 5,940,564 A | 8/1999 | Jewell |
| 6,034,717 A | 3/2000 | Dentinger et al. |
| 6,233,100 B1 | 5/2001 | Chen et al. |
| 6,307,663 B1 | 10/2001 | Kowarz |
| 6,411,425 B1 | 6/2002 | Kowarz et al. |
| 6,416,181 B1 | 7/2002 | Kessler et al. |
| 6,511,182 B1 | 1/2003 | Agostinelli et al. |
| 6,702,442 B2 | 3/2004 | Agostinelli et al. |

MONOCENTRIC AUTOSTEREOSCOPIC OPTICAL APPARATUS USING A SCANNED LINEAR ELECTROMECHANICAL MODULATOR

CROSS REFERENCE TO RELATED APPLICATIONS

This is a divisional application of Ser. No. 10/137,676, filed May 2, 2002 now U.S. Pat. No. 6,768,585.

FIELD OF THE INVENTION

This invention generally relates to autostereoscopic display systems for viewing electronically generated images and more particularly relates to an apparatus and method for generating left- and right-eye images using a scanned linear micro-electromechanical modulator as its image source with a monocentric arrangement of optical components to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a 3-dimensional (3-D) image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer.

In an article in *SID 99 Digest*, "Autostereoscopic Properties of Spherical Panoramic Virtual Displays," G. J. Kintz discloses one approach to providing autostereoscopic display with a wide field of view. Using the Kintz approach, no glasses or headgear are required. However, the observer's head must be positioned within a rapidly rotating spherical shell having arrays of LED emitters, imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

One class of autostereoscopic systems that operates by imaging the exit pupils of a pair of projectors onto the eyes of an observer is as outlined in an article by S. A. Benton, T. E. Slowe, A. B. Kropp, and S. L. Smith ("Micropolarizer-Based Multiple-Viewer Autostereoscopic Display," in *Stereoscopic Displays and Virtual Reality Systems VI*, SPIE, January, 1999). Pupil imaging, as outlined by Benton in the above-mentioned article, can be implemented using large lenses or mirrors. An observer whose eyes are coincident with the imaged pupils can view a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other device. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

It is also known that conflict between depth cues associated with vergence and accommodation can adversely impact the viewing experience. Vergence refers to the degree at which the observer's eyes must be crossed in order to fuse the separate images of an object within the field of view. Vergence decreases, then vanishes as viewed objects become more distant. Accommodation refers to the requirement that the eye lens of the observer change shape to maintain retinal focus for the object of interest. It is known that there can be a temporary degradation of the observer's depth perception when the observer is exposed for a period of time to mismatched depth cues for vergence and accommodation. It is also known that this negative effect on depth perception can be mitigated when the accommodation cues correspond to distant image position.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of mirrors.

Conventional solutions for stereoscopic imaging have addressed some of the challenges noted above, but there is room for improvement. For example, some early stereoscopic systems employed special headwear, goggles, or eyeglasses to provide the 3-D viewing experience. As just one example of such a system, U.S. Pat. No. 6,034,717 (Dentinger et al.) discloses a projection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat. No. 5,908,300 (Walker et al.) discloses a hang-gliding simulation system in which an observer's head is maintained in a fixed position. While such a solution may be tolerable in the limited simulation environment disclosed in U.S. Pat. No. 5,908,300, and may simplify the overall optical design of an apparatus, constraint of head movement would be a disadvantage in an immersion system. Notably, the system disclosed in the Walker et al. patent employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired output pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience. In addition, images displayed using such a system are real images, presented at close proximity to the observer, and thus likely to introduce the vergence/accommodation problems noted above.

It is generally recognized that, in order to minimize vergence/accommodation effects, a 3-D viewing system should display its pair of stereoscopic images, whether real or virtual, at a relatively large distance from the observer. For real images, this means that a large display screen must be employed, preferably placed a good distance from the observer. For virtual images, however, a relatively small curved mirror can be used as is disclosed in U.S. Pat. No. 5,908,300 (Walker). The curved mirror acts as a collimator, providing a virtual image at a large distance from the observer. Another system for stereoscopic imaging is disclosed in "Membrane Mirror Based Autostereoscopic Display for Tele-Operation and Telepresence Applications," in Stereoscopic Displays and Virtual Reality Systems VII, Proceedings of SPIE, Volume 3957 (McKay, Mair, Mason, Revie) which uses a stretchable membrane mirror. Although the apparatus disclosed in the McKay article provides a small exit pupil, it is likely that this pupil could be enlarged somewhat simply by scaling the projection optics. However, the apparatus disclosed in the McKay article has limited field of view, due to the use of conventional projection optics and due to dimensional constraints that limit membrane mirror curvature.

Curved mirrors have also been used to provide real images in stereoscopic systems, where the curved mirrors are not used as collimators. Such systems are disclosed in U.S. Pat. Nos. 4,623,223 (Kempf) and 4,799,763 (Davis et al.) for example. However, systems such as these are generally suitable where only a small field of view is needed.

Notably, existing solutions for stereoscopic projection project images onto a flat screen, even where that image is then reflected from a curved surface. This can result in undesirable distortion and other image aberration, constraining field of view and limiting image quality overall.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible pupils to the observer, so as to allow some freedom of movement, and to provide an ultra-wide field of view. It is recognized in the optical arts that each of these requirements, by itself, can be difficult to achieve. An ideal autostereoscopic imaging system must meet the challenge for both requirements to provide a more fully satisfactory and realistic viewing experience. In addition, such a system must provide sufficient resolution for realistic imaging, with high brightness and contrast. Moreover, the physical constraints presented by the need for a system to have small footprint, and dimensional constraints for interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in U.S. Pat. No. 3,748,015 minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, requiring separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75 degree angular fields. The Biogon lens consists of seven component lenses and is more than 80 mm in diameter, while only providing a pupil size of 10 mm. For larger pupil size, the lens needs to be scaled in size, however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In U.S. Pat. No. 5,206,499, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view.

Another specialized use of ball lens characteristics is disclosed in U.S. Pat. No. 4,854,688 (Hayford et al.) In the optical arrangement of the Hayford et al. patent, directed to the transmission of a CRT-generated 2-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,978 (Thompson), which teaches use of a ball lens as part of an objective lens in binocular optics for night viewing.

With U.S. Pat. Nos. 4,124,978 and 4,854,688 described above disclose use of a ball lens in image projection, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. For example, conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the LaGrange invariant. Any imaging system conforms to the LaGrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the Lagrange value associated with the device is small. A monocentric imaging system, however, providing a large field of view with a large pupil size (that is, a large numerical aperture), inherently has a large LaGrange value. Thus, when this monocentric imaging system is used with a spatial light modulator having a small LaGrange value, either the field or the aperture of the imaging system, or both, will be under-filled due to such a mismatch of Lagrange values. For a detailed description of the Lagrange invariant, reference is made to *Modern Optical Engineering, The Design of Optical Systems* by Warren J. Smith, published by McGraw-Hill, Inc., pages 42–45.

Commonly-assigned U.S. Pat. No. 6,416,181 (Kessler et al.) and copending U.S. patent application Ser. No. 09/854,699 take advantage of capabilities for wide field of view projection using a ball lens in an autostereoscopic imaging system. In these copending applications, the source image that is provided to the projecting ball lens for each eye is presented as a complete two-dimensional image. The image source disclosed in each of these applications is a two-dimensional array, such as a liquid crystal display (LCD), a digital micromirror device (DMD), or similar device. The image source could alternately be a cathode ray tube (CRT) which, even though generated by a scanned electron beam, presents a complete two-dimensional image to ball lens projection optics.

There are some inherent limitations in providing a complete two-dimensional image. Ideally, a curved image field is preferred, with the center of curvature of this field coincident with the center of the ball lens, since this arrangement minimizes field aberrations. However, providing a curved image field requires either curving the image source itself or providing an additional faceplate or special relay optics in the imaging path. Curving a two-dimensional image array to obtain or approximate spherical curvature of the image source would be difficult and costly. Employing a faceplate or special relay optics with a planar image array has disadvantages including added cost and overall loss of brightness. Maintaining sufficient brightness for projection is a concern when using small two-dimensioned arrays, since this can be difficult to achieve without special design techniques and higher-cost components. Thus, it can be appreciated that there can be improvements to overall cost of system optics for generating and projecting images for stereoscopic viewing.

Ball lenses and ball lens segments have been used as scanning components in sensor applications for wide field-of-view optical scanning. U.S. Pat. No. 6,233,100 (Chen et al.) discloses a concentric sensor scanning system that employs a rotatable scanning ball lens segment with one or more reflective facets. In the system disclosed in U.S. Pat. No. 6,233,100, rotation of a ball lens or ball lens segment directs incoming radiation onto a concentric row of sensors. However, existing projection systems designs have utilized more conventional projector optics components and, in doing this, have overlooked possible deployment of ball lenses or ball lens segments as scanning components for projecting light in a scanned fashion in order to produce an image.

There are a number of techniques used to form a two-dimensional image by scanning, either with either a point source, such as a conventional CRT electron beam, or with a linear source. U.S. Pat. No. 6,511,182 (Agostinelli et al.) discloses the use of a number of types of linear sources with a scanning system. Among solutions proposed in U.S. Pat. No. 6,511,182 are LED arrays and resonant fiber optic scanners.

Microelectromechanical devices have been developed as spatial light modulators in a variety of applications, including optical processing, printing, optical data storage, spectroscopy, and display. Microelectromechanical modulators include devices such as grating light valves (GLVs), developed by Silicon Light Machines, Sunnyvale, Calif. and described in U.S. Pat. No. 5,311,360 (Bloom et al.) and electromechanical conformal grating devices as disclosed in U.S. Pat. No. 6,307,663 (Kowarz). These modulators produce spatial variations in phase and amplitude of an incident light beam using arrays of individually addressable devices that are arranged as a periodic sequence of reflective elements forming electromechanical phase gratings. Such microelectromechanical grating devices are of particular interest as linear modulators because they provide sufficient speed for two-dimensional displays and have very good contrast and optical efficiency. At the same time, these devices are mechanically compact and rugged and can be produced at relatively low cost. However, microelectromechanical modulators have been largely overlooked as suitable components for immersive optics applications providing wide field of view. With the advent of low-cost laser light sources, however, there is opportunity for exploiting light-efficient alternatives such as microelectromechanical modulators in intermediate- and large-size immersion display systems. It is necessary, however, to couple this type of light modulation solution with an image projection system that is capable of providing the wide field of view needed for effective immersion optics.

Thus, it can be seen that, while there are some conventional approaches that meet some of the requirements for stereoscopic imaging, there is a need for an improved autostereoscopic imaging solution for viewing electronically generated images, where the solution provides a structurally simple apparatus, minimizes aberrations and image distortion, and meets demanding requirements for wide field of view, large pupil size, high brightness, and lowered cost.

SUMMARY OF THE INVENTION

Briefly, according to one aspect of the present invention, an autostereoscopic optical apparatus for viewing a stereoscopic virtual image comprises an array of image pixels, the stereoscopic virtual image comprising a left image to be viewed by an observer at a left viewing pupil and a right image to be viewed by the observer at a right viewing pupil, the apparatus comprising:

(a) an image generation system for forming a left two-dimensional intermediate image and for forming a right two-dimensional intermediate image, the image generation system comprising:
  (a1) a linear image modulator for modulating an incident light beam from a light source to form a modulated light beam;
  (a2) a first beamsplitter for splitting the modulated light beam into a left image beam and a right image beam, the left image beam directed to a left diffusive surface for forming a left line of source pixels and the right image beam directed to a right diffusive surface for forming a right line of source pixels;
  (a3) a left scanning ball lens assembly for projecting the left line of source pixels to form a left intermediate line image and a right scanning ball lens assembly for projecting the right line of source pixels to form a right intermediate line image, each scanning ball lens assembly comprising:
    (a3a) at least one reflective surface for reflecting light from the left or right line of source pixels to the left or right intermediate line image, respectively;
    (a3b) a ball lens segment having a scanning ball lens pupil, the ball lens segment having a center of curvature on the at least one reflective surface;
  each left and right scanning ball lens assembly rotating about an axis and forming a series of adjacent intermediate line images in order to sequentially form the left and right two-dimensional intermediate image thereby;
(b) a curved mirror having a center of curvature placed substantially optically midway between the left scanning ball lens assembly and the right scanning ball lens assembly;
(c) a second beamsplitter disposed to form the left two-dimensional intermediate image near a front focal surface of the curved mirror and to form the right two-dimensional intermediate image near the front focal surface of the curved mirror; and the curved mirror forming the virtual stereoscopic image of the left and right two-dimensional intermediate images and, through the second beamsplitter, forming a real image of the left scanning ball lens pupil at the left viewing pupil and a real image of the right scanning ball lens pupil at the right viewing pupil.

A feature of the present invention is the use of a monocentric arrangement of optical components, thus simplifying design, minimizing aberrations and providing a wide field of view with large exit pupils.

A further feature of the present invention is the use of an electromechanical grating device for forming a linear image, scanned by a ball lens segment having a reflective surface in order to provide a scanned, two-dimensional intermediate image.

A further feature of the present invention is that it allows a number of configurations, including configurations that minimize the number of optical components required, even including configurations that eliminate the need for a beamsplitter.

It is an advantage of the present invention is that it eliminates the need for a higher cost two-dimensional surface as image source, replacing this with a lower cost electromechanical grating device.

It is a further advantage of the present invention that it allows use of inexpensive, bright light sources for generating an intermediate image for projection. The high spectral purity of laser sources helps to maximize the achievable color gamut for a display apparatus.

It is a further advantage of the present invention that it provides a compact arrangement of optical components, capable of being packaged in a display system having a small footprint.

It is a further advantage of the present invention that it allows high-resolution stereoscopic electronic imaging with high brightness and high contrast, with a very wide field of view. The present invention provides a system that is very light-efficient, capable of providing high brightness levels for projection.

It is a further advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an exit pupil of sufficient size for non-critical alignment of an observer in relation to the display.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
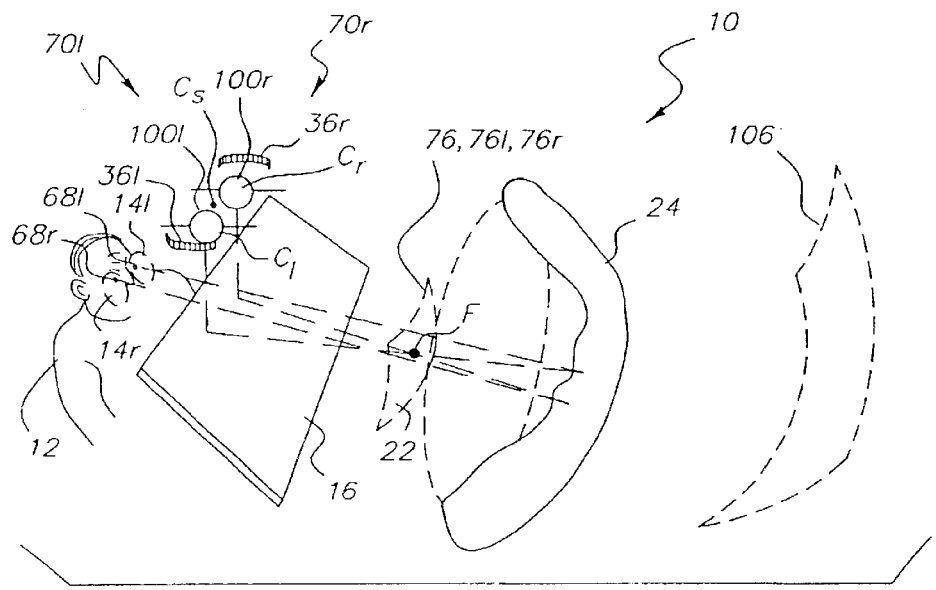
FIG. 1 is a perspective view showing key components of the apparatus of the present invention in an autostereoscopic imaging system.

Referring to FIG. 1, there is shown a perspective view of an autostereoscopic imaging system 10. An observer 12 is typically seated in position to view a virtual stereoscopic image from left and right viewing pupils 14l and 14r. Optimal viewing conditions are obtained when left and right eye pupils 68l and 68r of observer 12 are coincident with the position of corresponding left and right viewing pupils 14l and 14r.

A left image generation system 70l, comprising a left scanning ball lens assembly 100l and a left line of source pixels 36l as a linear image source, projects the image intended for left viewing pupil 14l. Correspondingly, a right image generation system 70r, comprising a right scanning ball lens assembly 100r and a right line of pixels 36r as a linear image source, projects the image intended for right viewing pupil 14r. Left image generation system 70l directs an image to a beamsplitter 16 which is interposed between observer 12 and a curved mirror 24. A left intermediate image 76l is formed near a focal surface 22 of curved mirror 24. Left intermediate image 76l is presented at left viewing pupil 14l as a virtual image 106, which appears to observer 12 as if the image is behind curved mirror 24. In similar fashion, right image generation system 70r directs an image to beamsplitter 16 which is interposed between observer 12 and curved mirror 24. A right intermediate image 76r is thereby formed near focal surface 22 of curved mirror 24. Right intermediate image 76r is presented at right viewing pupil 14r as a virtual image 106, which appears to observer 12 as if the image is behind curved mirror 24. As a result, observer 12 is presented with a virtual stereoscopic image that comprises separate left and right images. The virtual stereoscopic image appears to be behind curved mirror 24, somewhere between the rear of curved mirror 24 and infinity.

The description that follows primarily focuses on the optical components that direct light to either one of viewing pupils 14l and 14r. It should be noted that similar optical components are employed for left image generation system and right image generation system, that is, for both left and right optical paths. For clarity, the description that follows applies to both right and left image generation system 70 components. Any distinction between right and left optical paths is made only when it is necessary to be precise. (Appended left "l" or right "r" designators for part numbers are, for this reason, omitted from this description unless needed.)

It must be noted that, as shown in FIG. 1, there are two components to the stereoscopic image seen by observer 12. As is represented in FIG. 1, the left and right optical paths cross in system 10, due to imaging by curved mirror 24.

FIG. 1 illustrates some of the key problems to be solved, from an optical design perspective, and shows an overview of the solution provided by the present invention. It is instructive to review key design considerations for achieving the most life-like stereoscopic viewing. In order to provide observer 12 with an effective immersion experience, a wide field of view is important, in excess of the 60 degrees available using prior art techniques. In order to be used comfortably by observer 12, viewing pupils 14l, 14r must be sufficiently large. As a design goal, autostereoscopic imaging system 10 of the present invention is intended to provide a field of view of at least 90 degrees with the diameter of viewing pupil 14 in excess of 20 mm diameter. To provide a viewable stereoscopic virtual image over a range of human interocular separations, scanning ball lens assemblies 100l and 100r are advantageously separated by an appropriate, empirically determined interaxial distance.

Alternately, the interaxial distance between scanning ball lens assemblies 100l and 100r could be manually adjusted to suit interocular dimensions of observer 12 or could be automatically sensed and adjusted by autostereoscopic imaging system 10. Components of left and right image generation systems 70l and 70r could be mounted on a boom, for example, allowing movement of each image generation system 70l, 70r relative to the other in order to compensate for interocular distance differences. Reference is made to commonly assigned U.S. patent application Ser. No. 09/854,699 to be incorporated herein, which describes automated sensing and adjustment of left- and right-eye projection assemblies using ball lenses. The same feedback loop apparatus and methods disclosed in this earlier application could also be applied for the apparatus of the present invention.

Monocentric Design of Image Path

Figure 2A:
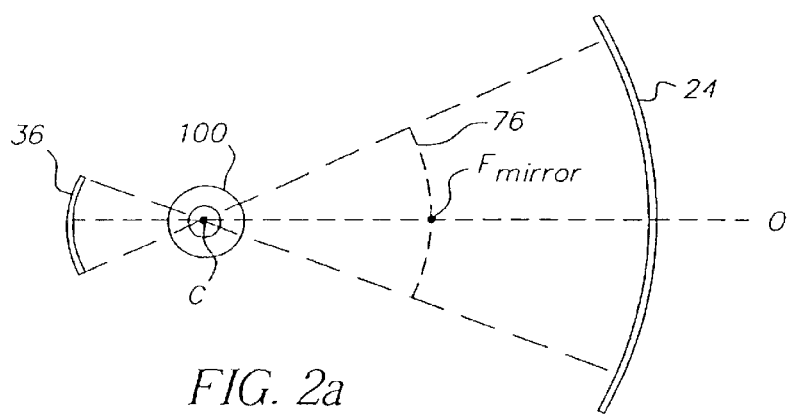
FIGS. 2a and 2b are side and top schematic views, respectively, showing the substantially concentric relationship of projection optics in an optically unfolded view.
Figure 2B:
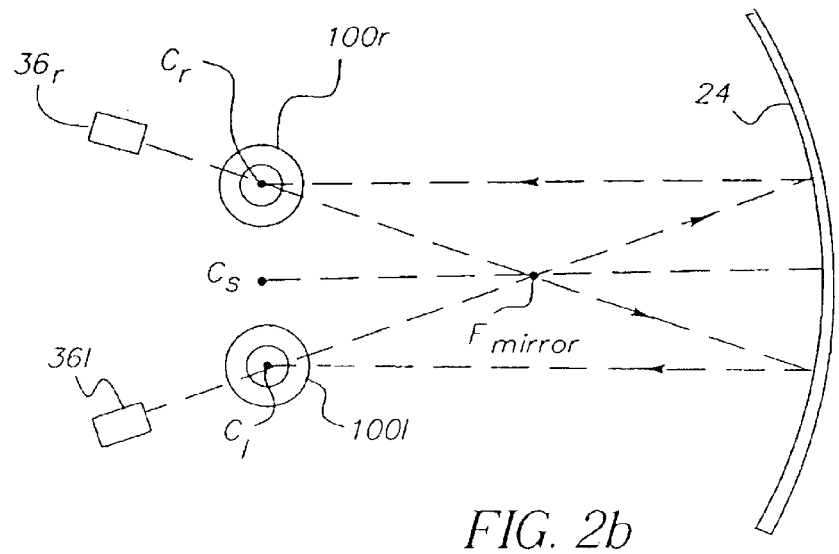

The monocentric arrangement of optical components in the apparatus of the present invention provides a number of clear advantages for minimizing image aberrations and for maximizing field of view. Referring to FIG. 2a, there is shown, from a side view, the optically concentric relationship of key components in the optical path, in unfolded form, applicable for both left and right image generation systems 70l and 70r. Referring to the top view of FIG. 2b, also in unfolded form, the center of curvature of mirror 24 is $C_s$, located midway between left and right scanning ball lens assemblies 100l and 100r. In the general scheme shown in FIG. 2a, line of source pixels 36, is preferably curved with the center of its radius of curvature at the center labeled $C_s$, which corresponds to center $C_l$ or $C_r$ of left or right scanning ball lens assemblies 100l or 100r as shown in FIG. 2b. Line of source pixels 36 generates a narrow line of the image to be projected, one line at a time. Scanning ball lens assembly 100 projects line of source pixels 36 to form intermediate image 76. As is represented in FIG. 2a, intermediate image 76 is also curved, sharing the same center of curvature as scanning ball lens assembly 100, at center C. Referring to FIGS. 1 and 2a, intermediate image 76 is located near focal surface 22 of curved mirror 24. Focal point $F_{mirror}$ of curved mirror 24 lies at the intersection of focal surface 22 with optical axis O. Curved mirror 24 is preferably spherical, again sharing the same center of curvature as scanning ball lens assembly 100 at center C.

It is instructive to observe that FIG. 2a gives a generalized, first approximation of the relationship of components in the unfolded optical path. Referring more closely to the top view of FIG. 2b, there is shown the actual position of the center of curvature of curved mirror 24, labeled $C_s$ in FIG. 2b, midway between the centers of curvature of left and right scanning ball lens assemblies 100l and 100r, labeled $C_l$ and $C_r$ respectively. It is also instructive to observe that the ideal placement of left and right scanning ball lens assemblies 100l and 100r for observer 12 would be such that their real images, formed by curved mirror 24, would correspond with the position and interocular separation of left and right viewing pupils 14l and 14r, respectively.

Referring back to FIG. 1 by way of reference, the optimal position of intermediate image 76 is within a range that can be considered "near" focal surface 22. The preferred range extends from focal surface 22 itself as an outer limit to within approximately 20% of the distance between focal surface 22 and the surface of curved mirror 24 as an inner limit. If intermediate image 76 were formed between focal surface 22 and observer 12, virtual image 106 would appear to be out of focus.

Because scanning lens assembly 100 is spherical with center of curvature at center C, as the unfolded arrangement of FIG. 2a shows, a wide field of view can be provided, with minimal image aberration. It must be noted that the design of the present invention is optimized for unity pupil magnification; however, some variation from unity pupil magnification is possible, within the scope of the present invention.

Figure 3:
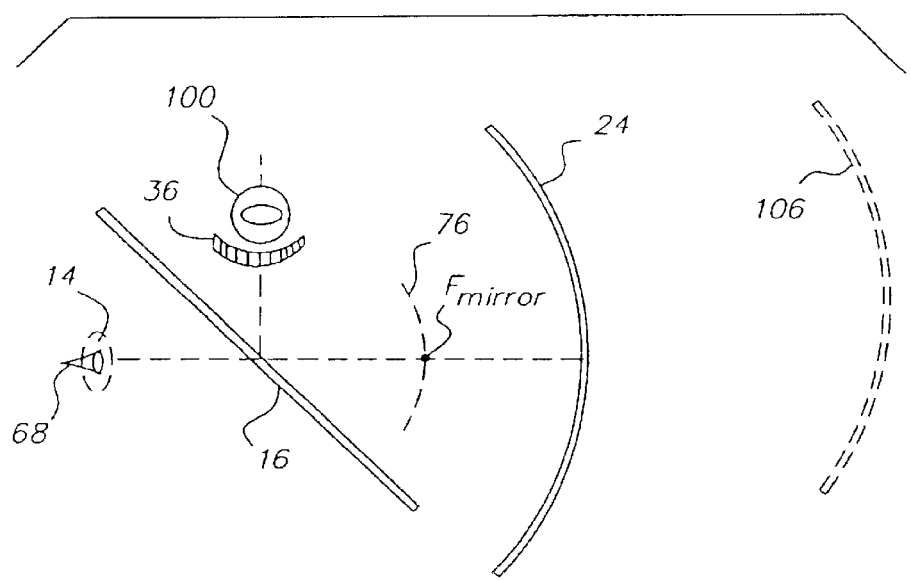
FIG. 3 is a schematic view showing the concentric relationship of projection optics as used by the system, in an optically folded view.

FIG. 3 shows a side view of the folded optical arrangement represented in FIG. 2a, showing how viewing pupil 14 is formed by the addition of beamsplitter 16. Beamsplitter 16 directs the light projected from scanning ball lens assembly 100 to form intermediate image 76. Virtual image 106 formed by curved mirror 24 is thereby visible, through beamsplitter 16, at viewing pupil 14.

It is important to keep in mind that the optical paths represented in FIGS. 2a and 3, and following are duplicated, with independent left and right image generation systems 70l and 70r.

Operation of Image Generation System 70

Scanning ball lens assembly 100 functions as both a reflective scanner and as a projection lens. Referring to FIGS. 4–7, both scanning and projection functions are shown. A reflective surface 102 within scanning ball lens assembly, as is shown in FIG. 5, performs the scanning function, much like the scanning mirror familiar in the optical scanning arts. In this scanning function, scanning ball lens assembly 100 rotates about an axis A in order to sequentially project each individual line of intermediate image 76 from the corresponding line of source pixels 36.

Referring to FIG. 5, line of source pixels 36 provides, for projection, a sequence of individual source pixels 104, in a linear arrangement. As is particularly shown in FIG. 5, the overall shape of line of source pixels 36 is preferably curved so that each source pixel 104 is at an equivalent radial distance r from center C of scanning ball lens assembly 100. Image generation system 70 is itself controlled by imaging logic circuitry (not shown), using scan synchronization techniques familiar to the imaging arts. This allows the modulation of each individual source pixel 104, using any of the well-known techniques for modulating light output. Conventional methods include pulse-width modulation and amplitude modulation, for example. Bit-oriented pulse-width modulation could be used, for example, whereby the total energy delivered to line of source pixels 36 is the sum of pulse widths having, for example, a bit depth of 8 bits. Amplitude modulation operates by simply varying the light level in each individual source pixel 104 of line of source pixels 36. A combination of pulse-width modulation with amplitude modulation could alternately be used to provide expanded dynamic range.

Scanning Activity

Figure 5:
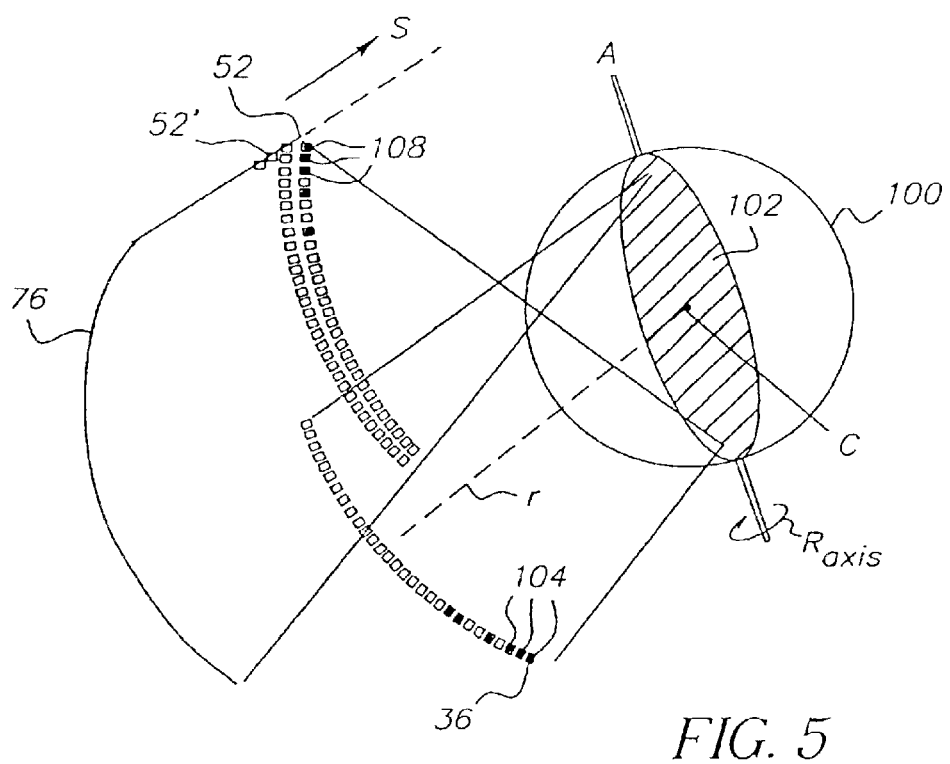
FIG. 5 is a perspective view representation showing, in exaggerated detail, how successive lines of source pixels form a curved linear image source projected by the scanning ball lens assembly to form a two-dimensional intermediate image.
Figure 6A:
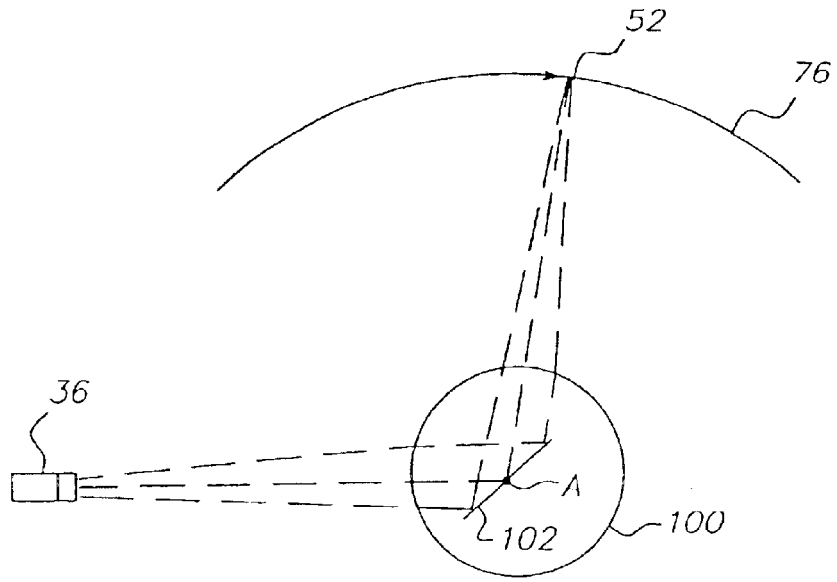
FIGS. 6a–6c are top views showing the relationship of the curved linear image source and scanning ball lens assemblies and the interaction of these components in order to create a scanned intermediate image.

Referring jointly to FIGS. 5 and 6a, the scanning action by which scanning ball lens assembly 100 projects line of source pixels 36 from its reflective surface 102 to form an intermediate line image 52, which comprises a line of image pixels 108, is represented. For illustration, only a small number of source pixels 104 are represented in FIG. 5. In a preferred embodiment, line of source pixels 36 provides a line containing at least a few hundred individual source pixels 104, each individual source pixel 104 imaged to a corresponding image pixel 108 within intermediate line image 52. As scanning ball lens assembly 100 rotates about axis A in the $R_{axis}$ direction, successive intermediate line images 52 are formed. In this way, intermediate line image 52' is formed at one instant, then, after a predetermined rotation distance of scanning ball lens assembly 100, the next intermediate line image 52 is formed, and so on. Due to the characteristics of scanning ball lens assembly 100 projection, source pixels 104 are inverted from line of source pixels 36 to form intermediate line image 52. As indicated in FIG. 5, this continuing activity forms intermediate image 76 by scanning in the S direction.

Referring back to FIG. 4, there is shown a perspective view of the scanning action of image generation system 70 for forming intermediate image 76 near focal surface 22 of curved mirror 24. It is instructive to note that the apparatus and method of the present invention allow the aspect ratio of intermediate image 76 to be variable within a range. With reference to FIG. 5, the length of line of source pixels 36 can be a value less than the maximum available line length. In the orthogonal direction, the number of intermediate line images 52 formed can also be less than the maximum number of lines available. By varying the number of activated pixels 104 and number of intermediate line images 52 created, image generation system 70 can thereby optimize the aspect ratio of intermediate image 76 to suit both the performance characteristics of autostereoscopic imaging system 10 and the preferences of observer 12.

Figure 6B:
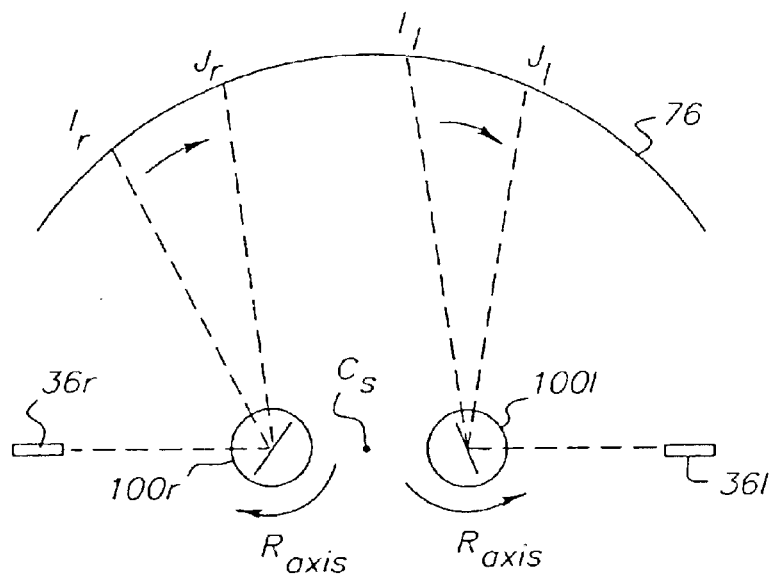
Figure 6C:
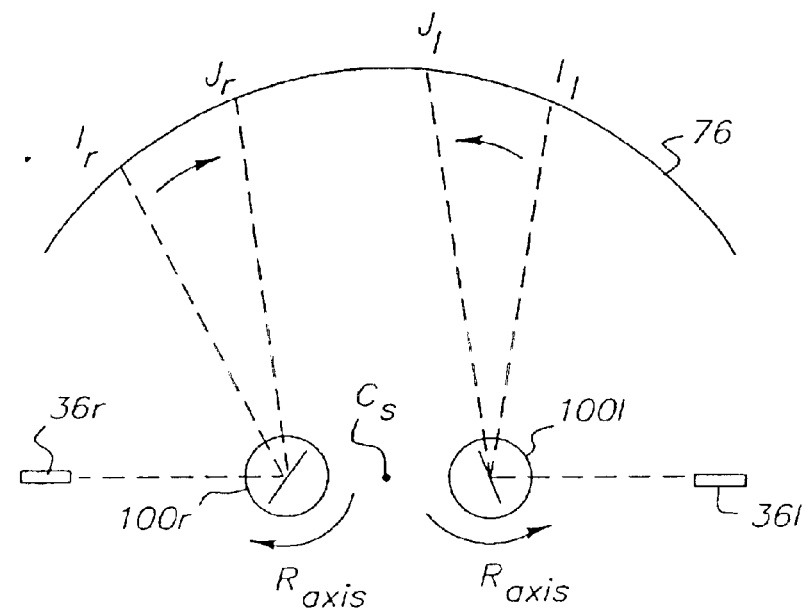

Referring again to FIG. 6a, there is shown a top view of the rotation of scanning ball lens assembly 100 for forming intermediate image 76, one intermediate line image 52 at a time. As has been noted, intermediate image 76 is formed by the scanning action of both left and right scanning ball lens assemblies 100l and 100r. Referring to FIGS. 6b and 6c, there are shown alternate ways in which left and right scanning ball lens assemblies 100l and 100r may rotate with respect to each other. In the example of FIG. 6b, both right and left scanning ball lens assemblies 100l and 100r rotate in the same direction as they sweep out intermediate line images 52 from an initial position $I_l$ and $I_r$ to a subsequent position $J_l$ and $J_r$, respectively. By contrast, FIG. 6c shows left and right scanning ball lens assemblies 100l and 100r rotating in the opposite direction. Either type of relative motion pattern could be used in an image generation system 70.

Figure 4:
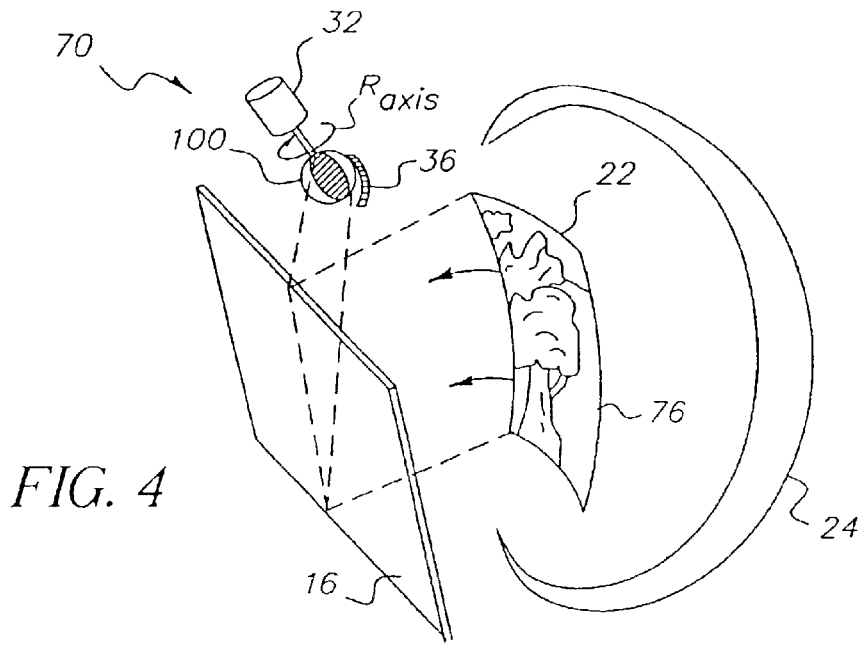
FIG. 4 is a perspective view showing, for one left or right image, the scanning action obtained from cooperation of the linear image generation system and scanning ball lens assembly.

As is shown in FIG. 4, a motor 32 is used to drive the rotation of scanning ball lens assembly 100. In a preferred embodiment, the rotational speed of scanning ball lens assembly 100 is 1800 RPM. Of course, by using a series of gears, belts, or other components for drive translation, with techniques well known in the mechanical arts, both left and right scanning ball lens assemblies 100l and 100r could be driven using a single motor 32.

Fabrication of Scanning Ball Lens Assembly 100

Figure 7:
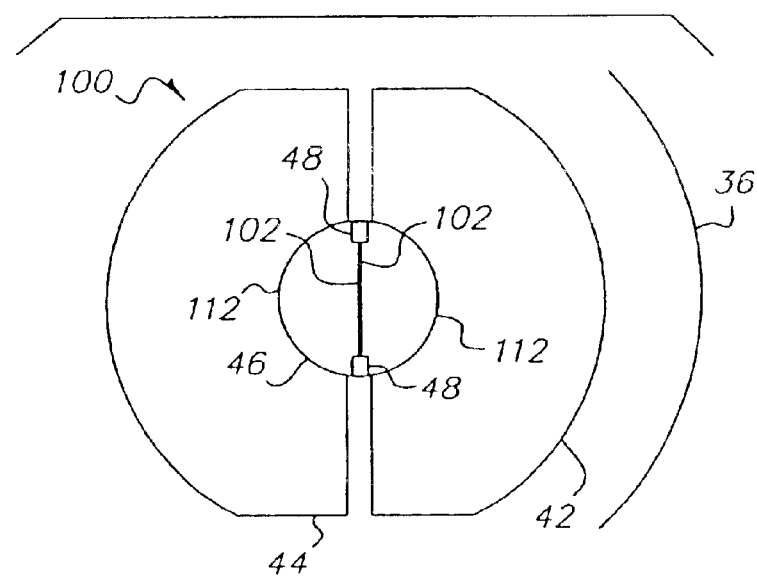
FIG. 7 is a cross-section view showing the composition of a scanning ball lens assembly.

Referring to FIG. 7, there is shown, in cross-sectional view, the structure of scanning ball lens assembly 100 in a preferred embodiment. A central spherical lens 46 is disposed between two meniscus lenses 42 and 44. Meniscus lenses 42 and 44 have indices of refraction and other characteristics intended to minimize on-axis spherical and chromatic aberration, as is well known in the optical design arts. Stops 48 limit the entrance pupil within scanning ball lens assembly 100. Stops 48 need not be physical, but may alternately be implemented using total internal reflection at the interfaces between outer meniscus lens 42 and spherical lens 46.

In a preferred embodiment, meniscus lenses 42 and 44 are selected to reduce image aberration and to optimize image quality at intermediate image 76. It must be noted that scanning ball lens assembly 100 could comprise any number of arrangements of support lenses surrounding central spherical lens 46. Surfaces of these support lenses, however many are employed, would share a common center of curvature C with central spherical lens 46. Moreover, the refractive materials used for lens components of scanning ball lens assembly 100 could be varied, within the scope of the present invention. For example, in addition to standard optical glass lenses, central spherical lens 46 could be plastic, with meniscus lenses 42 and 44 made of glass, plastic, enclosed liquids, or other suitable refractive materials, all within the scope of the present invention. In its simplest embodiment, scanning ball lens assembly 100 could be simply a single central spherical lens 46 with its reflective surface 102.

A planar reflective surface 102 can be fabricated in a number of different ways. In a preferred embodiment, reflective surface 102 is two-sided, formed on one half of the hemisphere used for spherical lens 46, using an aluminum coating. Scanning ball lens assembly 100 is then assembled, typically using an optical cement, to provide reflective surface 102 on the meridional plane of scanning ball lens assembly 100, with two opposite reflective sides. As another option, at higher cost, a broadband interference coating could be applied to either or both hemispheres of spherical lens 46 for improved reflectivity. Reflective surface 102 may be formed over the full surface area of the meridional plane as is represented in FIG. 5. Alternately, depending on the geometry of display optics, reflective surface 102 may occupy only a central portion of the meridional plane of scanning ball lens 100, as is represented in FIG. 7.

Referring again to FIG. 7, the optimal arrangement for mechanical rotation is to provide reflective surface 102 as a two-sided mirror, so that a hemispheric lens segment 112 is disposed on top of each reflective surface 102. As an alternative, the lens structure of scanning ball lens assembly 100 could simply be a single hemispheric lens segment 112, with only a one-sided reflective surface 102. In that case, however, other mechanical techniques for partial rotation of scanning ball lens assembly 100 would need to be employed. For example, it would be possible to use scanning ball lens assembly 100 having only one hemispheric lens segment 112, so that reflective surface 102 is one-sided. Using full rotation with such arrangement, however, would reduce the scanner duty cycle by a factor of two. In such a case, options available for maximizing speed of a projection autostereoscopic imaging system 10 would include mechanical devices that provide reciprocating motion for scanning by scanning ball lens assembly 100. Such an approach, however, would add cost and mechanical complexity and might also require compensation for non-uniform scan velocity.

It is instructive to note that scanning ball lens assembly 100 cannot operate throughout its full rotation, but would have some restriction on its usable range or duty cycle. Where this may be a limiting factor, reciprocating motion of scanning ball lens assembly 100 could provide improved duty cycle that may justify the added cost and mechanical complexity.

It can be appreciated that the arrangement of components shown in FIGS. 1–7 present a novel approach to the challenge of achieving wide field of view in a projection system.

Composition and Operation of Image Generation System 70

Figure 8A:
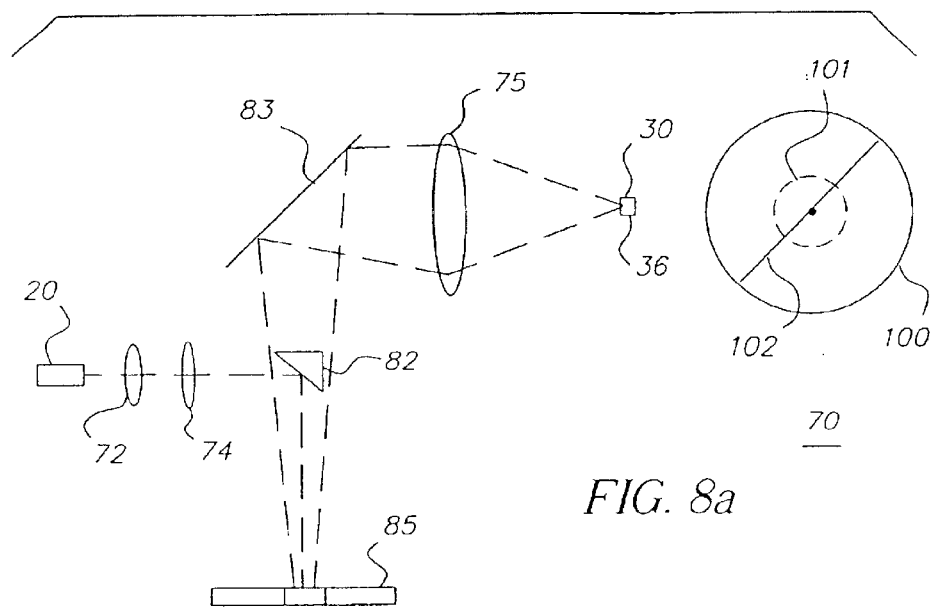
FIG. 8a is a schematic view showing the line-scanning mechanism for a single color in the image generation system of the present invention.

Referring to FIG. 8a, there is shown a schematic diagram of image generation system 70 for a single color channel. A light source 20 provides illumination that is directed toward a turning mirror 82, through a spherical lens 72 and a cylindrical lens 74. Light reflected from turning mirror 82 is modulated at an electromechanical grating light modulator 85. Modulated diffracted light from electromechanical grating light modulator 85 is diffracted past turning mirror 82, folded at a mirror 83, and directed by lens 75 onto a diffusive surface 30 in order to form line of source pixels 36. As a general principle, optical efficiency is a function of the number of diffracted orders captured from electromechanical grating light modulator 85. For high optical efficiency and high contrast in a preferred embodiment, line of source pixels 36 is preferably formed from two or more diffracted orders of the modulated light from electromechanical grating light modulator 85. Reflective surface 102 within scanning ball lens assembly 100 then projects line of source pixels 36 in order to form intermediate image 76, as is shown in FIGS. 4, 5, 6a, 6b, and 6c.

In order to provide the needed brightness and spectral content for high-quality immersive imaging with a broad color gamut, light source 20 is a laser in the preferred embodiment. For example, red light source 20r can be a single-mode laser diode from Sharp Corporation.

In a preferred embodiment, electromechanical grating light modulator 85 is an electromechanical conformal grating device as disclosed in U.S. Pat. No. 6,307,663. Such devices have performance advantages over other types of grating light modulators, including optimal positioning of the plane of diffraction and improved spatial separation. Other types of grating light modulators, such as GLV devices, could alternately be used.

Diffusive surface 30 provides a curved surface on which line of source pixels 36 is formed. Referring again to FIG. 8a, observe that scanning ball lens assembly 100 has a ball lens pupil 101. Diffusive surface 30 is required because it is necessary to substantially fill ball lens pupil 101 uniformly in order to provide a uniform viewing pupil 14. In a preferred embodiment, diffusive surface 30 is a fiber optic faceplate, such as those manufactured by Incom, Inc., Charlton, Mass. for example. Diffusive surface 30 could alternately be fabricated from an etched or ground transparent substrate such as glass or a suitable polymer material, whose surface has the appropriate curvature for forming line of source pixels 36. Diffusive surface 30 could alternately be formed by applying a diffusive coating onto a suitable transparent substrate that is appropriately curved or onto a fiber optic faceplate. Lens 75 is designed to provide a negative field curvature appropriate for forming line of source pixels 36 on curved diffusive surface 30.

Figure 8B:
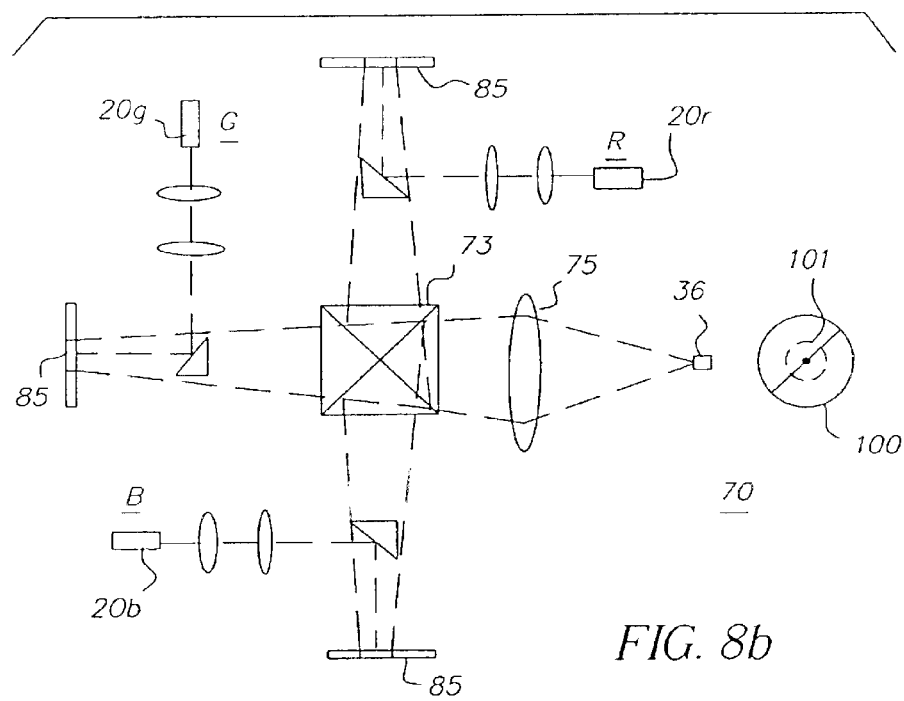
FIG. 8b is a schematic view showing a composite, 3-color arrangement of components for the image generation system.

Referring to FIG. 8b, there is shown the method for combining primary colors to form line of source pixels 36 as a full-color image. A red light source 20r, a green light source 20g, and a blue light source 20b are separately modulated, each at its respective electromechanical grating light modulator 85. A color combining cube 73 is then used to combine the modulated red, green, and blue (RGB) light for forming line of source pixels 36 on diffusive surface 30. The preferred embodiment uses RGB color, however, use of alternate colors is possible. In addition, four or more colors could be combined to provide an expanded color gamut, for example.

Color combining cube 73 is an X-cube or X-prism in the preferred embodiment. Alternately, other color-combining components could be employed, such as Philips prisms, for example. Or, an arrangement of dichroic surfaces could be provided for color synthesis, combining the modulated light from each color path, as is well-known in the digital image projection arts.

Options for Curved Mirror 24 Arrangement

To match the interocular distance of observer 12, the actual shape of curved mirror 24 can be adjusted to vary to some degree from a precise spherical shape. An aspheric shape could be used for curved mirror 24, to minimize off-axis pupil aberration, for example.

Curved mirror 24 can be a fairly expensive component to fabricate using traditional forming, grinding, and polishing techniques. It may be more practical to fabricate mirror 24 from two or more smaller mirror segments, joined together to assemble one large mirror 24.

As yet another alternative embodiment, curved mirror 24 may comprise a membrane mirror, such as a stretchable membrane mirror (SMM), whose curvature is determined by a controlled vacuum generated in an airtight cavity behind a stretched, reflective surface. Use of a stretchable membrane mirror is disclosed in the McKay article, referenced above.

Curved mirror 24 can alternately be embodied a replicated mirror, such as the replicated mirrors manufactured by Composite Mirror Applications, Inc., Tuscon, Ariz., for example. Single, curved replicated mirrors fabricated using composite replicated mirror technology offer particular advantages for cost, weight, and durability. Other possible alternatives for curved mirror 24 include Fresnel mirrors, or retroreflective mirrors or surfaces.

Figure 9:
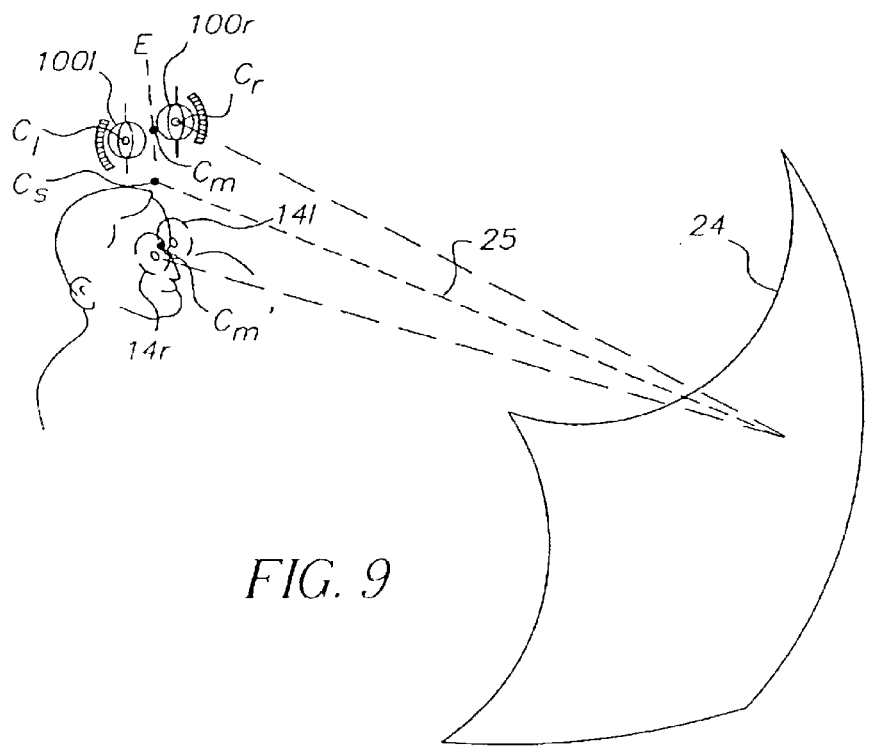
FIG. 9 is a perspective view showing key components of the apparatus of the present invention for an alternate embodiment autostereoscopic imaging system using a curved mirror and essentially paraxial optics.

Referring to FIG. 9, there is shown an alternate, substantially monocentric arrangement in which left and right scanning ball lens assemblies 100l and 100r, disposed near an optical axis 25, project directly into curved mirror 24, without the use of beamsplitter 16, as was shown in FIGS. 1–4. For such an arrangement, curved mirror 24 must have acceptable off-axis performance, since the image path for each viewing pupil 14l and 14r must be more than slightly off-center relative to the center of curvature $C_s$ of curved mirror 24. Aspheric mirrors could be employed for such an arrangement. In order for the arrangement of FIG. 9 to be feasible, the ratio of off-axis distance ($C_s$ to $C_m$ in FIG. 9) to the focal length of spherical curved mirror 24 must be small. As a rule-of-thumb, it has been determined that curved mirror 24 with a spherical surface can perform satisfactorily provided that the off-axis angle of left and right scanning ball lens assemblies 100l and 100r is within approximately 6 degrees.

For off-axis angles in excess of six degrees, an aspherical surface for curved mirror 24 is more suitable. For such an aspherical surface, a first center of curvature point $C_m'$ is located midway between viewing pupils 14l and 14r. A second center of curvature point $C_m$ is located midway between respective center points $C_l$ and $C_r$ of scanning ball lens assemblies 100l and 100r. Such an aspherical design could be toroidal and would be monocentric with respect to an axis E passing through points $C_m$ and $C_m'$. In cross-section, curved mirror 24 fabricated in this manner would be elliptical, with points $C_m$ and $C_m'$ serving as foci of the ellipse.

Figure 10:
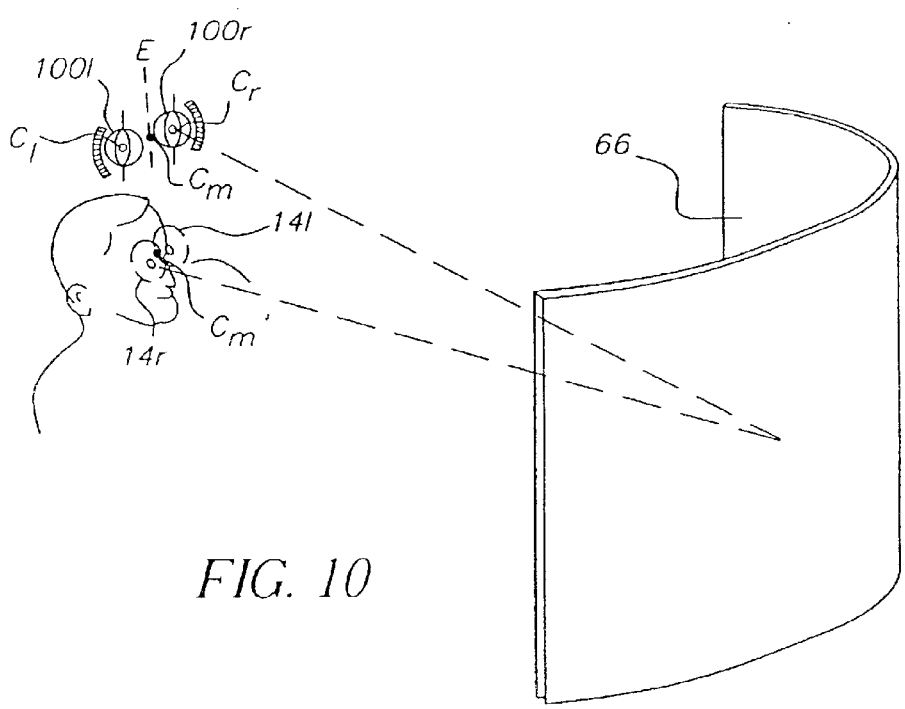
FIG. 10 is a perspective view showing key components of the apparatus of the present invention for another alternate embodiment autostereoscopic imaging system using a Fresnel mirror and essentially paraxial optics.

Referring to FIG. 10, there is shown yet another alternate arrangement, also without beamsplitter 16, similar to that shown in FIG. 9. In FIG. 10, curved mirror 24 is a cylindrically curved, reflective Fresnel mirror 66. The arrangement of components shown in FIG. 10 is monocentric with respect to axis E, as was shown in FIG. 9. Reflective Fresnel mirror 66 has power in only one direction. Reflective Fresnel mirror 66 can be, for example, a planar element fabricated on a flexible substrate, similar to Fresnel optical components manufactured by Fresnel Optics, Rochester, N.Y. Fresnel mirror 66 could be curved into a generally cylindrical shape about axis E, as is shown in FIG. 9. Optionally, Fresnel mirror 66 could be essentially flat. Fresnel mirror 66 would image the exit pupils of scanning ball lens assemblies 100l, 100r onto viewing pupils 14l, 14r in a similar manner to that described above for curved mirror 24.

As yet another option, curved mirror 24 could be replaced using a retro-reflective surface, such a surface having an essentially spherical shape with center of curvature coincident with that of scanning ball lens assembly 100. A retro-reflective surface would not introduce the image-crossing effect caused by curved mirror reflection. It must be noted, however, that this alternate arrangement would provide a real image, not the virtual image formed by autostereoscopic imaging system 10 in the preferred embodiment.

Optional Embodiment for Scanning Ball Lens Assembly 100

Figure 11:
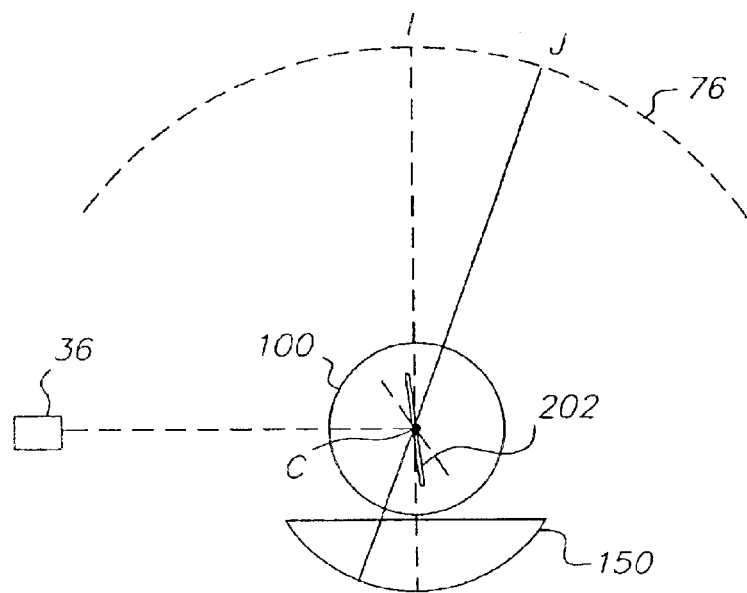
FIG. 11 is a schematic view showing an alternate embodiment in which scanning ball lens assembly is provided with a beamsplitter surface.

Referring to FIG. 11, there is shown an optional embodiment of the present invention, in which a beamsplitter surface 202, partially reflective, is provided in place of reflective surface 102 within scanning ball lens assembly 100. With this construction, scanning ball lens assembly 100 effectively acts as a refractive, rotating beamsplitter. Light from line of source pixels 36 reflects from beamsplitter surface 202 onto a spherical mirror 150 and is transmitted through beamsplitter surface 202 to form intermediate image 76. FIG. 11 shows one possible scan path, with scanning ball lens assembly 100 rotating in a clockwise direction, tracing out lines of intermediate image 76 from initial position I to subsequent position J. With this arrangement, curved line of source pixels 36 is conjugate to the surface of spherical mirror 150. Spherical mirror 150 can provide a substantially spherical surface, with its center of curvature coincident with center C of scanning ball lens assembly 100.

The alternate arrangement of optical components shown in FIG. 11 offers an additional, practical design advantage. Magnification between the conjugate surfaces of line of source pixels 36 and spherical mirror 150 allows line of source pixels 36 to be larger than is feasible with other embodiments, alleviating size constraints and lowering the cost of generating line of source pixels 36.

Eye-sequential Embodiment

Figure 12:
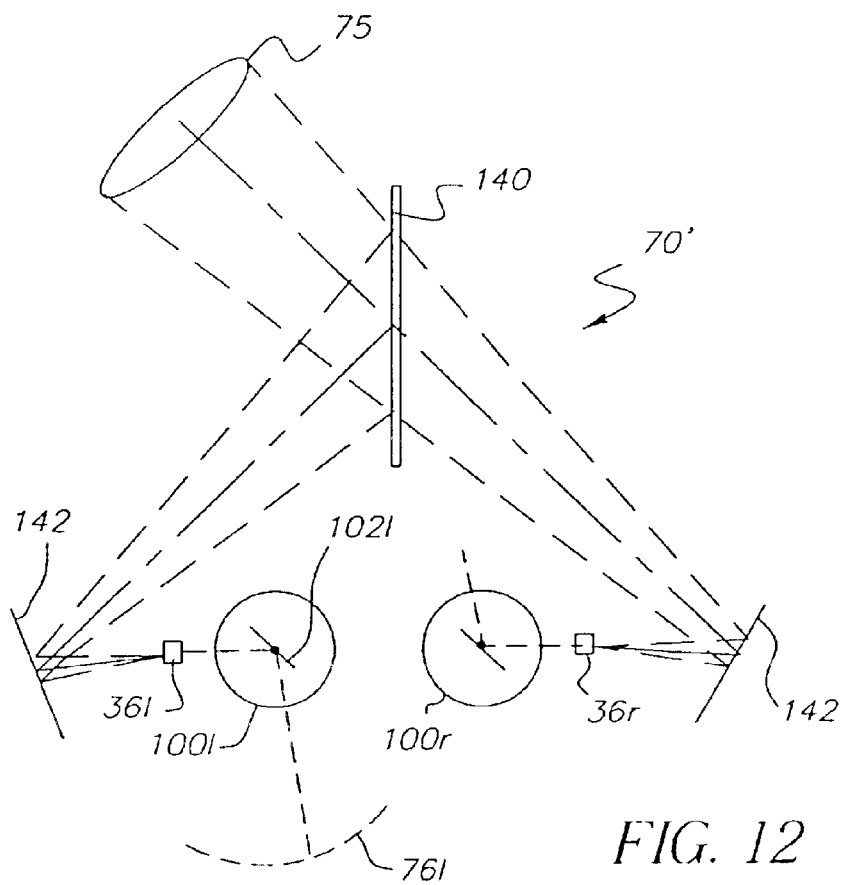
FIG. 12 is a schematic view showing an arrangement of components that sequentially scans generated images for separate left- and right-eye views.

An alternate embodiment of autostereoscopic imaging system 10 takes advantage of the speed of electromechanical grating light modulators 85 to utilize a single modified image generation system 70' to provide both left- and right-eye images. Using the component arrangement shown in FIG. 12, modified image generation system 70' cycles rapidly, forming left intermediate image 76l and right intermediate image 76r in rapid succession, at a high enough rate to give the appearance of continuous image projection. Referring to FIG. 12, modified image generation system 70' comprises both left and right scanning ball lens assemblies 100l and 100r with a beamsplitter 140 and mirrors 142. The upstream image-forming components that provide the image to lens 75 are the same as those shown in FIG. 8b. Not shown are the various timing and synchronization and image data path logic components needed to coordinate loading of the proper image data synchronized with the rotation of left and right scanning ball lens assemblies 100l and 100r.

As has been noted above, there is some "dead time" during the rotation of scanning ball lens assembly 100, during which reflective surface 102 is not at a suitable angle for forming intermediate image 76. Looking ahead to FIG. 13, the arrangement of FIG. 12 synchronizes the dead time for both scanning ball lens assemblies 100 so that left intermediate 76l is formed using left scanning ball lens assembly 100l during the dead time for right scanning ball lens assembly 100r. Correspondingly, right intermediate image 76r is formed using right scanning ball lens assembly 100r during the dead time for left scanning ball lens assembly 100l. With this arrangement, there may be no need to shutter between projection of left and right intermediate images 76l and 76r.

Figure 13:
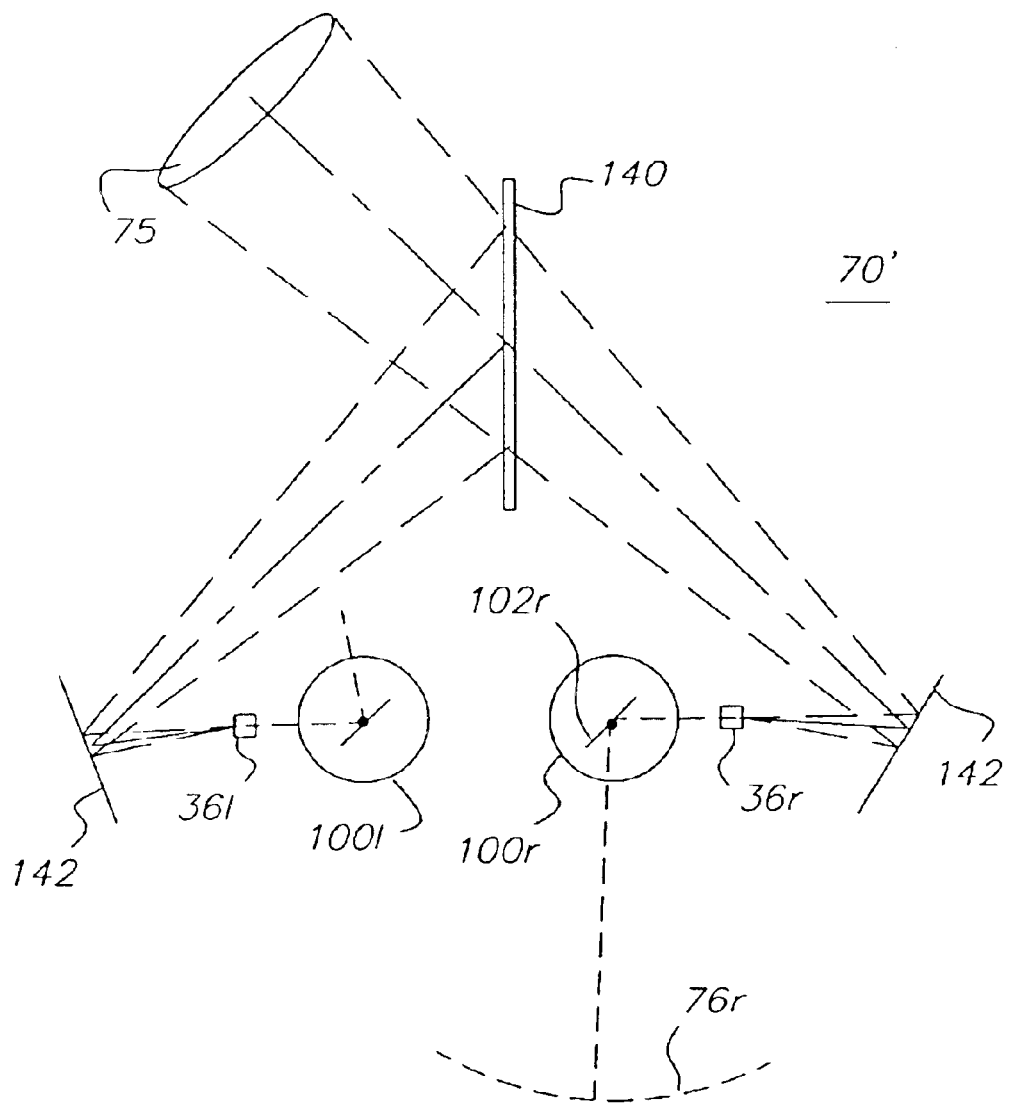
FIG. 13 is a schematic view showing sequential generation of right-eye images using the arrangement of FIG. 12.

Referring to FIG. 12, the image path is as follows. Lens 75 directs modulated light toward a beamsplitter 140 which splits the light evenly into left and right imaging paths. In each path, a mirror 142 then directs modulated light onto diffusive surface 30 to form left and right line of source pixels 36l and 36r, respectively. Left intermediate image 76l is formed in an arc as shown when left scanning ball lens assembly 100l scans at the appropriate angles. Moments later, as shown in FIG. 13, right intermediate image 76r is formed by right scanning ball lens assembly 100r. Using this configuration, the same image is directed to both scanning ball lens assemblies 100l and 100r. Each individual scanning ball lens assembly 100 alternately forms its respective intermediate image 76 or effectively deflects the unwanted modulated light during its alternating dead time interval. In a preferred embodiment, the rotation angles of scanning ball lens assemblies 100l and 100r are aligned in order to maintain their respective reflective surfaces 102l and 102r in substantially parallel planes during rotation. Other arrangements are possible.

Figure 14:
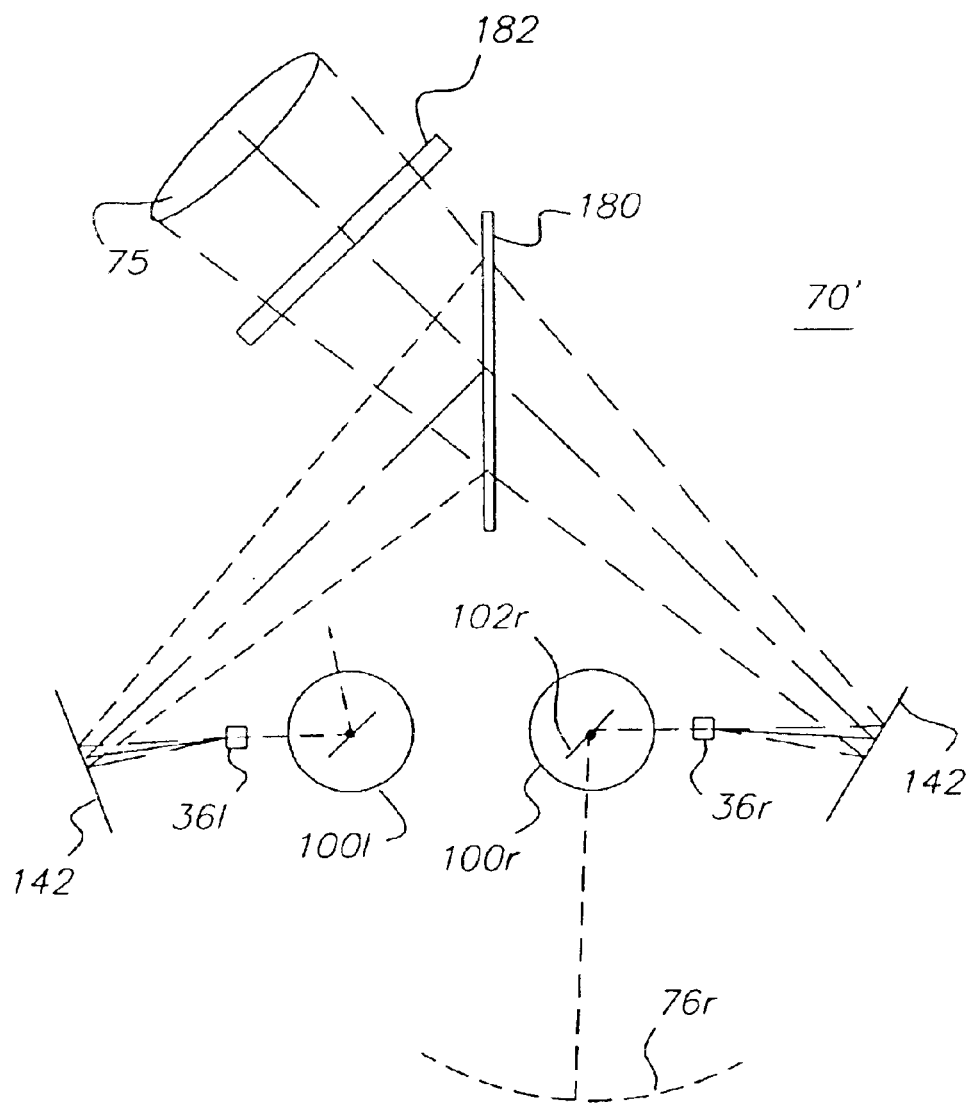
FIG. 14 is a schematic view showing an alternate embodiment for sequential generation of left- and right-eye images.

Although beamsplitter 140 provides a simple and inexpensive approach for splitting light from lens 75 into separate left- and right-eye paths, the arrangement of FIGS. 12 and 13 wastes half of the available light. There would be advantages in switching light so that the full beam of light from lens 75 is used for forming an image using left or right line of source pixels 36l or 36r for each left- and right-eye image respectively. Methods for switching light that are widely used in the optical arts include mechanical manipulation of mirrored surfaces for example. Referring to FIG. 14, there is shown another alternate arrangement of modified image generation system 70' in which all of the light from lens 75 is successively switched between left- and right-eye paths. A liquid crystal shutter 182 operates by rotating the polarization of incident light from lens 75. A polarizing beamsplitter 180 transmits light having one polarization and reflects light having the opposite polarization state. By switching the incident light from lens 75 between polarization states, liquid crystal shutter 182 thus effectively directs the light to either left or right line of source pixels 36l or 36r, in synchronization with the rotation of left and right scanning ball lens assemblies 100l and 100r. Similarly, liquid crystal shutter 182 could be replaced by a rotating waveplate for successively switching the polarization state. It must be noted that methods that switch polarization state, as described with reference to FIG. 14, would require that the light for each color emerging from lens 75 have the same polarization state. This may not be easy to achieve with some conventional types of color-combining components. However, using methods well known in the optical design arts, a multi-order waveplate can be employed to selectively rotate polarization states of different colors. With reference to FIG. 14, one method for selectively changing polarization state would use an appropriately designed multi-order waveplate disposed between lens 75 and liquid crystal shutter 182.

Figure 15A:
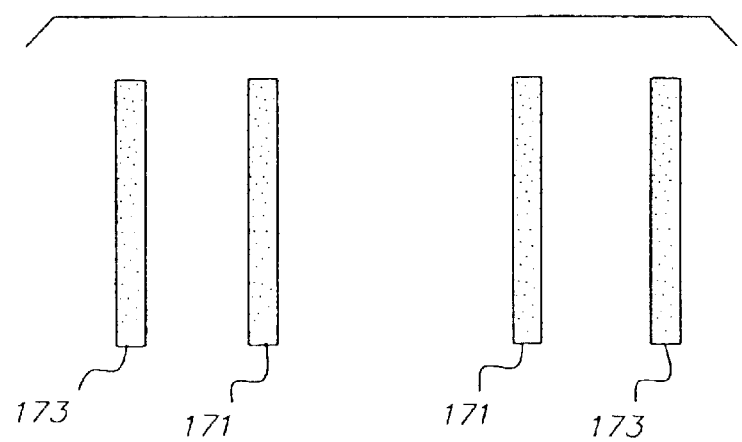
FIGS. 15a–15c are plane views showing the action of a patterned mirror used in an optional embodiment.
Figure 15B:
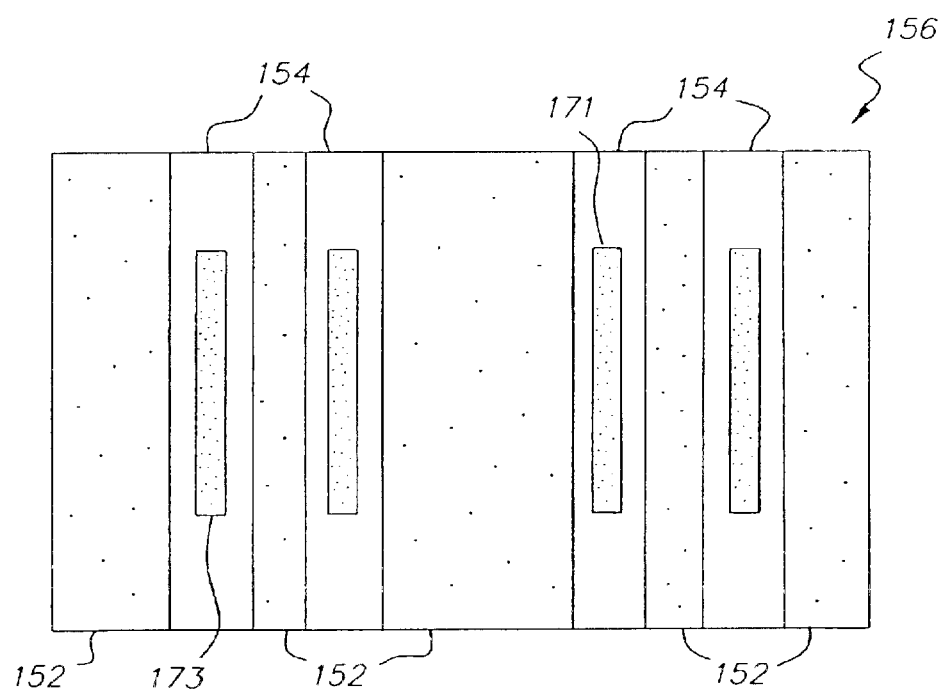
Figure 15C:
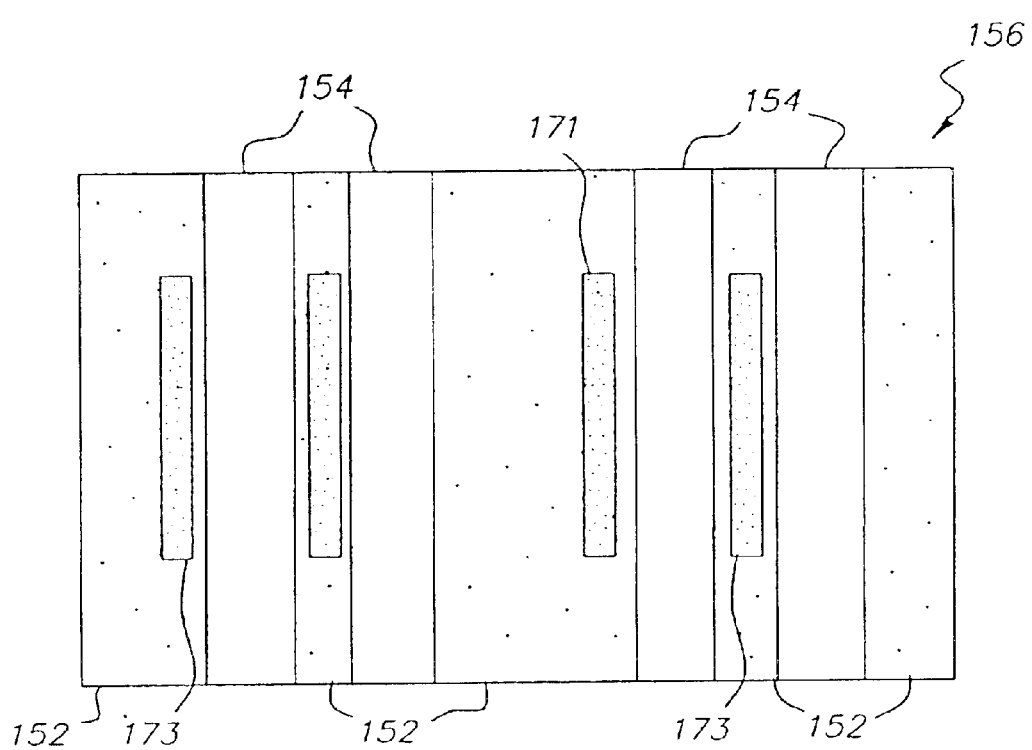

Referring to FIGS. 15b and 15c, yet another alternative method for switching light uses a patterned mirror 156. This method takes advantage of the spatial pattern of light modulated from electromechanical grating light modulator 85. As FIG. 15a shows, and as is described in more detail in U.S. Pat. No. 6,411,425 (Kowarz et al.), this pattern essentially comprises a first diffraction order 171 and a second diffraction order 173. As FIG. 15b shows, patterned mirror 156 comprises reflective portions 152 and transmissive portions 154, dimensioned to correspond to the spatial positions of first diffraction order 171 and second diffraction order 173. In one position of patterned mirror 156, as shown in FIG. 15b, transmissive portions 154 are aligned to allow transmission of first and second diffraction orders 171 and 173. Then, with a lateral translation of patterned mirror 156, as shown in FIG. 15c, reflective portions 152 are aligned so that first and second diffraction orders 171 and 173, represented in outline in FIG. 15c, are reflected. By reciprocating between the positions represented in FIGS. 15b and 15c, patterned mirror 156 forms an optical switch, which could be substituted in the position of beamsplitter 140 in FIG. 12 to alternately direct all of the light from lens 75 to left and right line of source pixels 36l and 36r.

It can be appreciated that the arrangements of FIGS. 12, 13, and 14 have cost advantages, since the same image-modulating and conditioning components serve both left and right image paths. It is important to emphasize that the arrangement of optical components shown in FIGS. 12, 13, and 14 can be used with other types of linear image modulators in addition to electromechanical grating devices. For example, the approach shown in FIGS. 12, 13 and 14 could be used with a resonant fiber, scanned laser or other point source, or linear LED array as is described in U.S. Pat. Nos. 6,511,182 and 6,702,442 (Agostinelli et al.). A single linear image modulation component can thereby serve to provide both left and right intermediate images 76 with this arrangement.

The preferred embodiment of the present invention provides an exceptionally wide field of view and the required brightness for stereoscoping imaging in excess of the 90-degree range, with viewing pupil 14 size near 20 mm. Moreover, scanning ball lens assembly 100 provides excellent off-axis performance and allows a wider field of view, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for supporting projection optics, for color multiplexing and sequencing, and for mirror surfaces that could be used with the monocentric arrangement of components disclosed for this invention.

Thus, what is provided is a monocentric optical apparatus for autostereoscopic display, using a scanned linear electromechanical modulator as its image source, providing a very wide field of view and large viewing pupils.

PARTS LIST

| | |
|---|---|
| 10. | Autostereoscopic imaging system |
| 12. | Observer |
| 14. | Viewing pupil |
| 14l. | Left viewing pupil |
| 14r. | Right viewing pupil |
| 16. | Beamsplitter |
| 20. | Light source |
| 20r. | Red light source |
| 20g. | Green light source |
| 20b. | Blue light source |
| 22. | Focal surface |
| 24. | Curved mirror |
| 25. | Optical axis |
| 30. | Diffusive surface |
| 32. | Motor |
| 36. | Line of source pixels |
| 36l. | Left line of source pixels |
| 36r. | Right line of source pixels |
| 42. | Meniscus lens |
| 44. | Meniscus lens |
| 46. | Spherical lens |
| 48. | Stop |

-continued

PARTS LIST

| | |
|---|---|
| 52. | Intermediate line image |
| 52'. | Intermediate line image |
| 66. | Fresnel mirror |
| 68. | Human eye pup |
| 68l. | Left human eye pupil |
| 68r. | Right human eye pupil |
| 70. | Image generation system |
| 70l. | Right image generation system |
| 70r. | Left image generation system |
| 70'. | Modified image generation system |
| 72. | Spherical lens |
| 73. | Color combining cube |
| 74. | Cylindrical lens |
| 75. | Lens |
| 76. | Intermediate image |
| 76l. | Left intermediate image |
| 76r. | Right intermediate image |
| 82. | Turning mirror |
| 83. | Mirror |
| 85. | Electromechanical grating light modulator |
| 100. | Scanning ball lens assembly |
| 100l. | Left scanning ball lens assembly |
| 100r. | Right scanning ball lens assembly |
| 101. | Ball lens pupil |
| 102. | Reflective surface |
| 102l. | Left reflective surface |
| 102r. | Right reflective surface |
| 104. | Source pixel |
| 106. | Virtual image |
| 108. | Image pixel |
| 112. | Hemispheric lens segment |
| 140. | Beamsplitter |
| 142. | Mirror |
| 150. | Spherical mirror |
| 152. | Reflective portion |
| 154. | Transmissive portion |
| 156. | Patterned mirror |
| 171. | First diffraction order |
| 173. | Second diffraction order |
| 180. | Polarizing beamsplitter |
| 182. | Liquid crystal shutter |
| 202. | Beamsplitter surface |

What is claimed is:

1. An autostereoscopic optical apparatus for viewing a stereoscopic virtual image comprising an array of image pixels, said stereoscopic virtual image comprising a left image to be viewed by an observer at a left viewing pupil and a right image to be viewed by the observer at a right viewing pupil, the apparatus comprising:

(a) an image generation system for forming a left two-dimensional intermediate image and for forming a right two-dimensional intermediate image, said image generation system comprising:

(a1) a linear image modulator for modulating an incident light beam from a light source to form a modulated light beam;

(a2) a first beamsplitter for splitting said modulated light beam into a left image beam and a right image beam, said left image beam directed to a left diffusive surface for forming a left line of source pixels and said right image beam directed to a right diffusive surface for forming a right line of source pixels;

(a3) a left scanning ball lens assembly for projecting said left line of source pixels to form a left intermediate line image and a right scanning ball lens assembly for projecting said right line of source pixels to form a right intermediate line image, each scanning ball lens assembly comprising:

(a3a) at least one reflective surface for reflecting light from said left or right line of source pixels to said left or right intermediate line image, respectively;

(a3b) a ball lens segment having a scanning ball lens pupil, said ball lens segment having a center of curvature on said at least one reflective surface;

each said left and right scanning ball lens assembly rotating about an axis and forming a series of adjacent said intermediate line images in order to sequentially form said left and right two-dimensional intermediate image thereby;

(b) a curved mirror having a center of curvature placed substantially optically midway between said left scanning ball lens assembly and said right scanning ball lens assembly;

(c) a second beam splitter disposed to form said left two-dimensional intermediate image near a front focal surface of said curved mirror and to form said right two-dimensional intermediate image near said front focal surface of said curved mirror; and said curved mirror forming said virtual stereoscopic image of said left and right two-dimensional intermediate images and, through said second beamsplitter, forming a real image of said left scanning ball lens pupil at said left viewing pupil and a real image of said right scanning ball lens pupil at said right viewing pupil.

2. An autostereoscopic optical apparatus according to claim 1 wherein said linear image modulator comprises an optical fiber.

3. An autostereoscopic optical apparatus according to claim 1 wherein said linear image modulator comprises an LED array.

4. An autostereoscopic optical apparatus according to claim 1 wherein said linear image modulator comprises a scanned light source.

5. An autostereoscopic optical apparatus according to claim 1 wherein said linear image modulator comprises a laser.

* * * * *